US010298567B1

(12) United States Patent
Chew et al.

(10) Patent No.: US 10,298,567 B1
(45) Date of Patent: May 21, 2019

(54) SYSTEM FOR PROVIDING MULTI-DEVICE ACCESS TO COMPLEMENTARY CONTENT

(71) Applicant: Amazon Technologies, Inc., Seattle, WA (US)

(72) Inventors: Yoong Han Chew, Seattle, WA (US); Peter Frank Hill, Seattle, WA (US); Kurt Kufeld, Seattle, WA (US); Sajeeva Lakmal Bandara Pallemulle, Woodinville, WA (US); Arun Sundaram, Seattle, WA (US); Ameet Nirmal Vaswani, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 14/572,455

(22) Filed: Dec. 16, 2014

(51) Int. Cl.
*G06F 15/16* (2006.01)
*H04L 29/06* (2006.01)

(52) U.S. Cl.
CPC .......... *H04L 63/0853* (2013.01); *H04L 63/10* (2013.01)

(58) Field of Classification Search
CPC ..... H04L 63/0428; H04L 63/08; H04L 63/10; H04L 29/06027; H04L 65/1069; H04L 65/403; H04L 67/02
See application file for complete search history.

(56) References Cited

U.S. PATENT DOCUMENTS

| 2002/0013869 | A1* | 1/2002 | Taniguchi | H04L 29/06 710/33 |
| 2004/0139360 | A1* | 7/2004 | Bliley | H02J 9/005 713/320 |
| 2005/0228874 | A1* | 10/2005 | Edgett | H04L 63/08 709/220 |
| 2007/0180488 | A1* | 8/2007 | Walter | H04N 5/783 725/135 |
| 2008/0146151 | A1* | 6/2008 | Lyu | H04B 17/318 455/41.2 |
| 2008/0281805 | A1* | 11/2008 | Xiaolu | G06F 17/30017 |
| 2011/0093891 | A1 | 4/2011 | Nakumura | |
| 2013/0060798 | A1* | 3/2013 | Howcroft | G06F 17/30038 707/756 |

(Continued)

OTHER PUBLICATIONS

"Second Screen", http://en.wikipedia.org/w/index.php?title=Second_screen&oldid=632065390, Nov. 1, 2014.

(Continued)

*Primary Examiner* — Michael A Keller
*Assistant Examiner* — Thao D Duong
(74) *Attorney, Agent, or Firm* — Knobbe, Martens, Olson & Bear, LLP

(57) ABSTRACT

A system is disclosed that enables a user to access a first piece of content on a first computing device while accessing a related, but different piece of content on a second computing device. In some cases, the different piece of content is a portion of the first piece of content. In some embodiments, the system can automatically identify complementary content and can automatically cause the second computing device to access the complementary content without the user interacting with the second computing device. In some cases, the system may reformat the complementary content for presentation to the user based on characteristics of the second computing device.

23 Claims, 6 Drawing Sheets

(56) References Cited

U.S. PATENT DOCUMENTS

| | | | |
|---|---|---|---|
| 2013/0117406 A1* | 5/2013 | Chevillat | H04N 21/4104 709/217 |
| 2014/0330951 A1* | 11/2014 | Sukoff | H04L 47/70 709/223 |
| 2015/0020087 A1* | 1/2015 | Rose | H04N 21/4316 725/20 |
| 2015/0080011 A1* | 3/2015 | Zelinka | H04W 4/02 455/456.1 |

OTHER PUBLICATIONS

U.S. Appl. No. 13/689,377, filed Nov. 29, 2012, Taylor et al.

* cited by examiner

SYSTEM FOR PROVIDING MULTI-DEVICE ACCESS TO COMPLEMENTARY CONTENT

BACKGROUND

Users may access a variety of content from a number of content sources including network-based content sources, such as network sites (e.g., sites on the Internet). The content may include streaming video, streaming audio, games, blogs, news, etc. Many users have multiple devices that they use to access content. For example, a user may access content when they are away from home on a smartphone or on a tablet. However, when the user returns home, the user may then access the content on a television or desktop computer.

In some cases, a user may be viewing video content that the user prefers to view on another device. In some such cases, the user may cause the video content to be transferred or mirrored to another device for access. This mirroring of content is a form of second screen content access that enables a user to switch devices for the user's content consumption convenience.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Further, elements are not drawn to scale and two elements that appear to be of the same size may be of different size, and vice versa.

DETAILED DESCRIPTION

Introduction

Figure 1A:
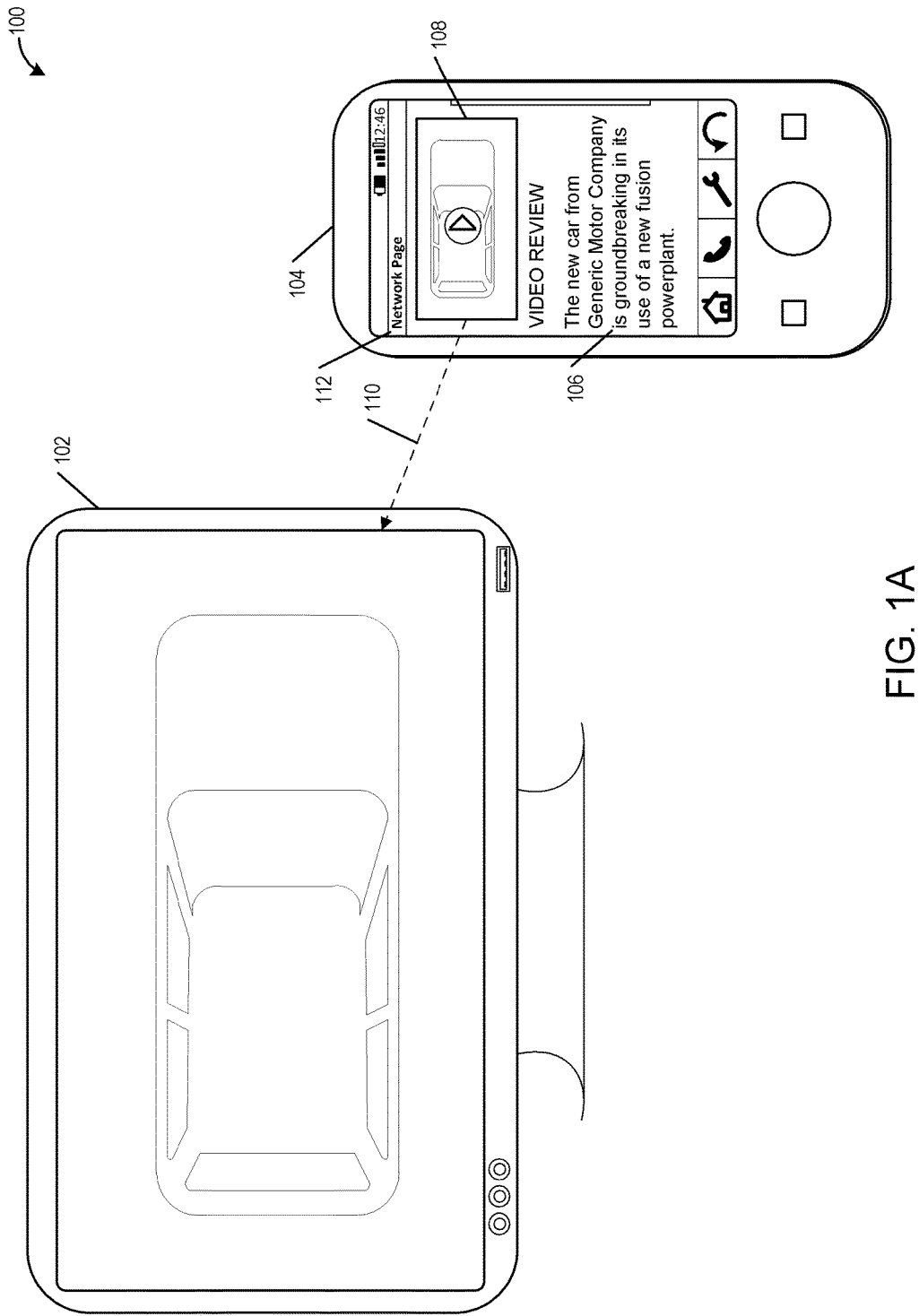
FIGS. 1A and 1B illustrate non-limiting examples of a process for accessing complementary content on a complementary device.

In some cases, a user way wish to access content that is related to content being accessed on another device. For instance, a user may wish to view a video review of a car on one device while reading a text review of the car on another device. To accomplish this, the user may cause one device to access one content item and then cause another device to access another content item. However, it is both time consuming and inconvenient to have the user interact with one device to access a first content item and then switch to another device to access the second content item. Further, to access two related content items in parallel, the user needs to be aware of the existence of both pieces of content and the network locations of both pieces of content, or content items.

Embodiments disclosed herein enable a user to access a first content item on a first computing device and have a second, related content item automatically accessed by a second computing device. The second piece of content, or second content item, may be a portion of the first piece of content or may otherwise be related to the first piece of content. In some cases, the second computing device may access the second piece of content without the user interacting with the second computing device.

To simplify discussion and not to limit the present disclosure, the first piece of content or content item may be referred to herein as "primary content" or "initial content" and the first computing device may be referred to as the "primary computing device" or "primary device." Similarly, to simplify discussion and not to limit the present disclosure, the second content may be referred to as "complementary content" and the second computing device may be referred to as a "complementary computing device" or a "complementary device." In some cases, the complementary device may also be referred to as a second device or a second screen.

In some embodiments disclosed herein, a user may identify a portion of primary content that the user desires to access on another device. For example, the user may select the content by using a long-press on the portion of the primary content. This identified portion of the primary content may serve as complementary content and may be accessed by a complementary device identified by the user or automatically determined based at least in part on the type of the complementary content and/or the location of the complementary device.

Alternatively, or in addition, the complementary content may be content other than the primary content that is semantically related to the primary content. For example, the complementary content may include network pages that relate to a network page that includes the primary content. For instance, assuming the primary content is an item detail page, the secondary content may be a network page that includes review content, recommendations of alternative items, additional product details, do it yourself (DIY) or how-to videos, etc. In another instance, assuming the primary content is a news article, the secondary content may be a network page that includes a related article, a list of articles by the same author, or a list of articles related to the same topic, etc. As a second example, the complementary content may include content that relates to a video or game. For instance, assuming the primary content is a television show or series, the secondary content may be a network page that includes cast information, a list of episodes in the television series, reviews for each episode, a recommendation of similar shows, or other semantically related content.

Further, in some embodiments, systems disclosed herein may automatically determine complementary content for a piece of primary content. This complementary content may be a portion of the primary content or other content that relates to the primary content.

Moreover, embodiments disclosed herein may automatically identify devices that can serve as the complementary device. The determination may be based on the type of complementary content as well as the capabilities of each potential complementary device. Further, the determination of whether to select a device to be a complementary device may be based on the location of the device with respect to the user. The user's location may be estimated based on a detected location of the primary device. In addition, the complementary device may be selected based on a status of the complementary device (e.g., whether the device is on or has sufficient battery power remaining, etc.) or whether the complementary device is in use.

Example Use Cases

Figure 1B:
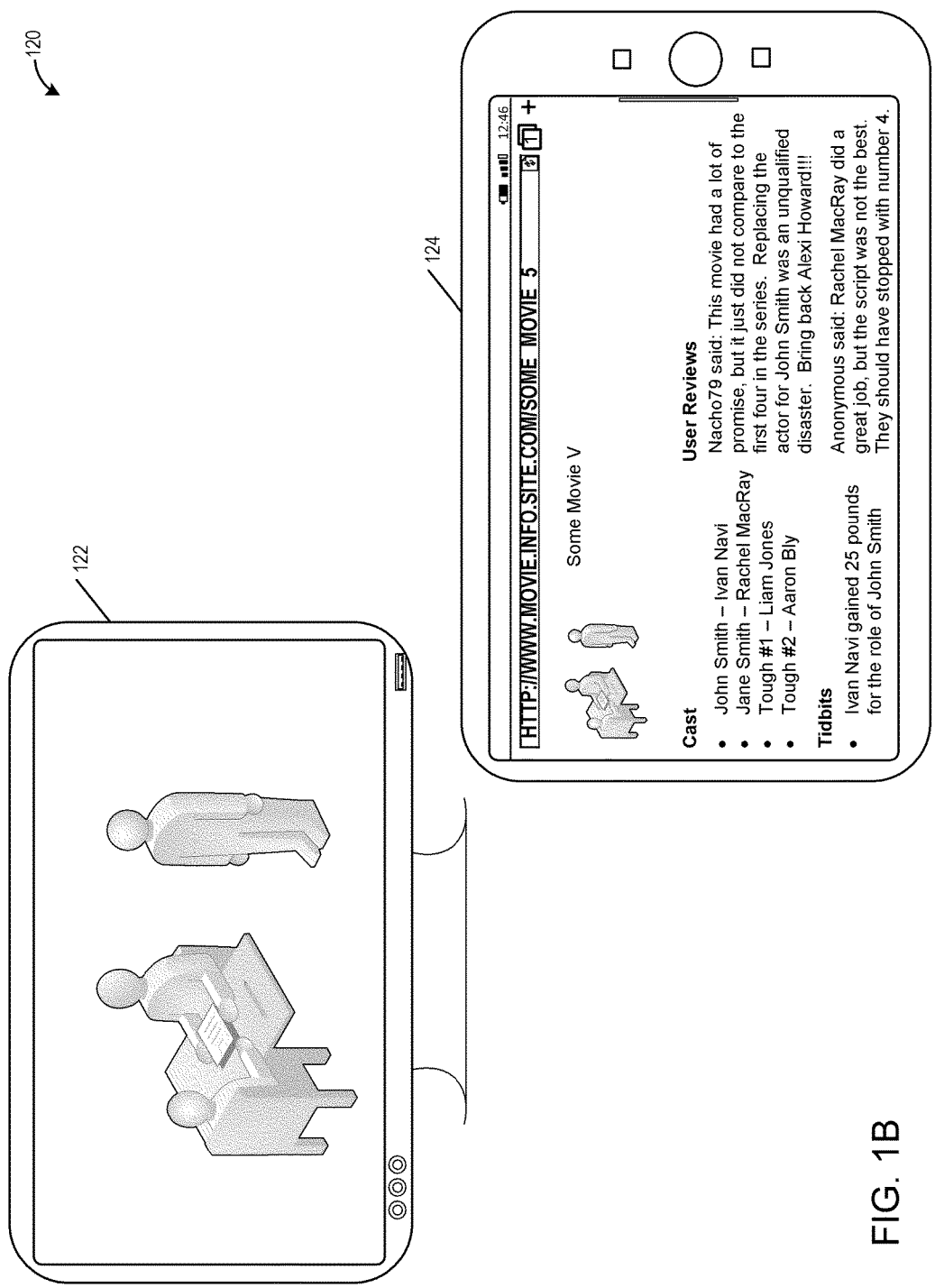

FIGS. 1A and 1B illustrate non-limiting examples of a process for accessing complementary content on a complementary device. FIG. 1A illustrates a multi-device environment 100 that includes a television 102 and a mobile device 104, such as a smartphone. In the example illustrated in FIG. 1A, the user is accessing a network page 112 on the mobile device 104. The network page 112 viewed by the user includes text content 106 and video content 108. For example, the network page 112 may be an article or blog reviewing a new car model, with the text content 106 being a written review of the car model and the video content 108 being a video review of the car model.

The video content 108 may include video illustrating the car driving around the track, video zooming in on particular features of interest of the new car, and any other type of video with respect to the new car that may be of interest to the user. In some scenarios, the user may be satisfied viewing the text content 106 on the mobile device 104. However, although the user can view the video content 108 on the mobile device 104, the user may desire to view the video content 108 on a larger display. As such, in this particular example, the user may desire to view the video content 108 on the television 102.

Using embodiments described herein, the user can send, or access, the video content 108 of the network page 112 viewed on the mobile device 104 to the television 102 for viewing. The accessing of the video content 108 on the television 102 may occur automatically or may occur in response to an action by the user. This transferring or accessing of the video content 108 on the television 102 is illustrated by the dashed line 110 of FIG. 1A. Further, while in some cases it is possible to view or access more or less of the network page 112 on the television 102, the user in this particular non-limiting example is accessing only the video content 108 on the television 102 and not the text content 106.

The user may cause the video content 108 to be accessed on the television 102 by performing an action with respect to the video content 108 on the mobile device 104. For example, the user may use a long-press, triple tap, or press a designated button to indicate that selected content is to be accessed on a second or complementary device, which in this example is the television 102, but in other cases, could be another device. In response to the action, the mobile device 104 may provide the video content 108 to the television 102 or information enabling the television 102 to access the video content 108 from a content source. Alternatively, or in addition, the mobile device 104 may provide a command to an intermediary device (not shown), which can cause the video content 108 to be provided to or accessed by the television 102. In some cases, the intermediary device may identify or determine what content is to serve as complementary content (e.g., the video content 108) and which device is to serve as the complementary device (e.g., the television 102). The intermediary device is described in more detail below, for example, with respect to FIG. 2.

FIG. 1B illustrates another multi-device environment 120 that includes a television 122 and a computing device 124, such as a tablet. In the example illustrated in FIG. 1B, the user is watching a movie on the television 122. The systems described herein may automatically detect that the computing device 124 is within a threshold distance from the television 122 and is in an accessible state (e.g., is capable of accessing content, is powered on, and/or is not currently in use). In response to detecting that the computing device 124 is within a threshold distance from the television 122 and is in an accessible state, embodiments described herein may access complementary content on the computing device 124 related to the movie being displayed on the television 122. This complementary content may include any type of content associated with the content, in this case the movie, being accessed on the television 122. For example, the complementary content may include a cast listing, reviews, trivia, and the like, relating to the movie being displayed on the television 122.

It should be understood that many other use cases are possible for the embodiments described herein beyond the two non-limiting examples illustrated in FIGS. 1A and 1B. For example, the complementary screen or device may be used to access review content or recommendations relating to content being accessed on another device, which may be referred to as a primary device for ease of discussion and not to be limiting. For instance, a user may access an item detail page for a particular baby crib or bed on one device and see reviews for the crib, recommendations of alternative cribs, and/or the identity of products often purchased with cribs on another device. Advantageously, in certain embodiments, by viewing the reviews and recommendations on a complementary device, the user can maintain a view of the product information on the primary device enabling the user to see both the review and recommendation content and the product information content without switching back and forth between network pages.

As another example, the complementary screen may be used to access statistics, such as fantasy sports statistics, while viewing one or more sports matches on the primary device. In some such cases, as the user accesses different sports matches, embodiments herein may automatically change the statistics presented on the complementary device to correspond to the sports match being accessed on the primary device.

Example Content Delivery Environment

Figure 2:
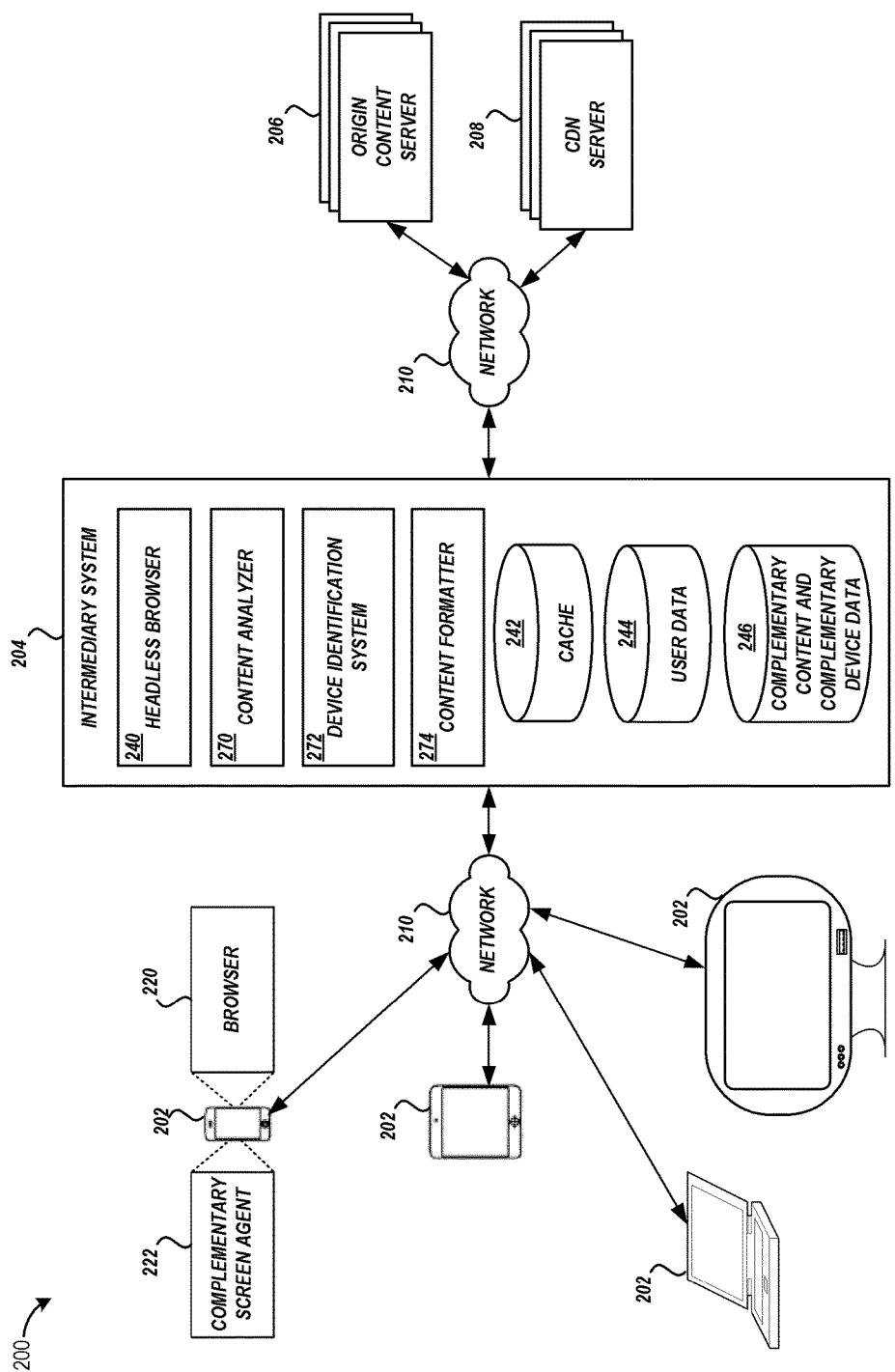
FIG. 2 illustrates an embodiment of a content delivery environment with an intermediary system that facilitates access of complementary content on a complementary device.

FIG. 2 illustrates an embodiment of a content delivery environment 200 with an intermediary system 204 that facilitates access of complementary content on a complementary device. The content delivery environment 200 includes various user devices 202, an intermediary system 204, and various content sources, including origin content servers 206 and content delivery network ("CDN") servers 208. The system components may communicate with each other via one or more communication networks 210. A network 210 may be a publicly accessible network of linked networks, possibly operated by various distinct parties. Further, in some cases, the network 210 may include the Internet. In other embodiments, the network 210 may include a private network, personal area network, local area network, wide area network, cable network, satellite network, cellular telephone network, etc., or combination thereof, each with access to and/or from an external network, such as the Internet.

As will be appreciated by those of skill in the relevant art, a content delivery environment 200 may include any number of distinct user devices 202 and/or content sources 206, 208. In addition, multiple (e.g., two or more) intermediary systems 204 may be included in the content delivery environment 200. For example, separate intermediary systems 204 may be located so that they are close (in either a geographical or networking sense) to groups of current or potential user devices 202 or content sources 206, 208. In such a configuration, a user device 202 may request content via the intermediary system 204 to which it is closest, rather than all user devices 202 requesting content via a single intermediary system 204.

The user devices 202 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), kiosks, speaker systems, and various other electronic devices and appliances.

Further, each of the user devices 202 may act as a primary device capable of accessing at least some type of content or primary content (e.g., network pages, videos, audio, etc.). In addition, at least some of the user devices 202 may also act as a complementary device, secondary device, or second screen capable of accessing a portion of the primary content or complementary content that is related to the primary content. For instance, a user device 202 serving as a primary device may access a network page with text content and video content. Another user device 202 acting as a complementary device may access an enlarged version of the video content or a second network page that is related to the network page accessed by the primary device. Generally, each of the user devices 202 that can serve as a complementary device may also serve as a primary device for particular types of content. In some embodiments, each user device 202 that can serve as a primary device can also serve as a complementary device for particular types of content.

At least some individual user devices 202 may execute a browser application 220 to communicate via the network 210 with other computing systems, such as the intermediary system 204 or content sources 206 and 208, in order to request and display content. In some cases, the browser application 220 may be able to access different content sources over a network. For example, the browser application 220 may be a network page browser or a web page browser. In other cases, the browser application 220 may enable the user to select content from a variety of content that is received from a single content source. For example, the browser application 220 may enable the user to select a video program to display from a variety of video programs available via a single television services provider (e.g., cable television or satellite television provider).

Illustratively, a user may use a browser application 220, or other application capable of accessing a network site, to request network-accessible content (e.g., content pages, images, video, etc.) hosted or provided by a content source, such as an origin content server 206 or a CDN server 208. The user device 202 or browser application 220 may be associated with the intermediary system 204 or otherwise configured to request the content through, and receive content display commands from, the intermediary system 204 rather than communicating directly with the content source.

At least some of the user devices 202 may include a complementary screen agent 222. The complementary screen agent 222 may be configured to identify portions of content to be provided to another user device 202 (e.g., a complementary device or second device). For example, the complementary screen agent 222 may identify video content on a mixed content-type network page to be provided for viewing on a complementary device. The complementary screen agent 222 may identify the portion of the content to be provided to another device automatically or in response to a user command.

In addition, the complementary screen agent 222 may be configured to modify the state of a user device 202 in response to receiving complementary content or in response to a command that may be received before the receipt of complementary content. Modifying the state of the user device 202 may include waking up the user device 202 from a sleep mode or activating the user device 202 from a powered off state.

In some cases, a complementary screen agent 222 of a first user device 202 (e.g., a smartphone) may identify content to be accessed on a second user device 202 (e.g., a television). The complementary screen agent 222 of the second user device may facilitate the accessing of the identified content by, for example, transitioning the television from a sleep state to an on state and setting the television to a mode for receiving content from an auxiliary source (e.g., a network site) instead of a primary source (e.g., a cable television provider).

The intermediary system 204 can be a computing system configured to retrieve content on behalf of user devices 202 and, in some cases, generate display commands for execution by the user devices 202. For example, the intermediary system 204 can be a server or group of servers that may be accessed via the network 210. In some embodiments, the intermediary system 204 may be a proxy server, a system operated by an internet service provider (ISP), or some other device or group of devices that retrieves content on behalf of user devices 202. Further, the intermediary system 204 may analyze content to determine whether portions of the content can be separated for display on a second user device 202. Moreover, the intermediary system 204 may analyze content to determine whether additional content exists that may complement the analyzed content and which may be displayed on the second user device 202.

The intermediary system 204 may include various modules, components, data stores, and the like to provide the content retrieval and processing functionality described herein. For example, the intermediary system 204 may include a server-based browser application or some other content rendering application to process content retrieved from content sources. Such a content rendering application may be referred to as a "headless browser" 240. Generally described, a headless browser 240 does not (or is not required to) cause display of content by a graphical display device of the server on which the headless browser 240 is executing. Instead, the headless browser 240 provides display commands, graphical representations, images, or other data or commands to separate user devices 202 that can cause the presentation of content accessed by the headless browser 240 on one or more of the separate user devices 202.

Illustratively, the headless browser 240 may obtain requested content from an origin content server 206 and/or CDN server 208, obtain additional items (e.g., images and executable code files) referenced by the requested content, execute code (e.g., JavaScript) that may be included in or referenced by the content, obtain additional content that may be related to the requested content (e.g., review content), and transmit the content or additional content to one or more user devices 202. By performing some or all of these operations at the intermediary system 204, the substantial computing resources and high-speed network connections typically available to network-based server systems may be leveraged to perform the operations much more quickly than would otherwise be possible on a user device 202 with comparatively limited processing capability.

Although the headless browser 240 does not typically cause the display of content by a graphical display device of the server, in some embodiments, it may. For example, in some cases, a copy of content provided to a user device 202 for display may also be displayed on the graphical display device of the intermediary system 204.

In some embodiments, the intermediary system 204 is included as part of an external network that is controlled, maintained, or owned by a separate entity than the entity or user who controls, maintains, or owns the user devices 202. However, in other cases, the intermediary system 204 is included as part of a local network that is controlled, maintained, or owned by the same entity or user who controls, maintains, or owns the user devices 202. Further, in some cases, the intermediary system 204 may be included as part of a router or other border device that separates a local network (e.g., private home network) from an external network (e.g., the Internet).

The intermediary system 204 may include additional modules, components, data stores, and the like to provide the features described above and in greater detail below. For example, the intermediary system 204 may include a cache 242 that stores content items retrieved from content sources 206 and 208. The intermediary system 104 may also include a "logged user behaviors" data store 244 that stores information about user requests and interactions with content. In some embodiments, the information stored in the behaviors data store 244 is kept for a specific time period and then automatically deleted. For example, data related to a browsing session may be stored while the browsing session is ongoing and then deleted when the browsing session ends. Thus, in this example, browsing may be optimized without compromising privacy.

In addition to the data stores 242 and 244, the intermediary system 204 may include a complementary content and complementary device data repository 246. This repository 246 may store the identity of complementary content for a particular piece of content, or in some cases the complementary content itself. This complementary content can include portions of the particular piece of content that may be extracted from the content and accessed separately from the content. Alternatively, or in addition, the complementary content may include other content that is associated with or corresponds to the particular piece of content. For example, the complementary content may include reviews, recommendations, statistics, metadata, etc.

In addition to storing the complementary content, or identification thereof, the repository 246 may store information relating to the user devices 202 for a user. The user device 202 information may include the identity of devices associated with a user, information for accessing the user devices 202 (e.g., an IP address or MAC address), characteristics of the user devices 202 (e.g., screen size, communication capabilities (e.g., IEEE 802.11ac support, 4G LTE support, etc.), user input support (e.g., keyboard, mouse, remote control, etc.), processing capability, etc.).

The intermediary system 204 may also include one or more additional systems, which may be implemented in specialized hardware or software, to facilitate performance of the embodiments described herein. For example, the intermediary system 204 may include a content analyzer 270, a device identification system 272, and a content formatter 274. The content analyzer 270 can include any system that can analyze content to determine whether it may be broken into separately accessible portions for presentation to a user. Generally, the content analyzer 270 identifies portions of content that can be presented separately without ruining the integrity of the content. For instance, a network page that includes both a text portion and a video portion may be apportioned such that the video content is viewed on a separate device from the text content. However, streaming video content provided by a content site as a single video may generally not be apportioned into separate videos or video frames that are viewed on separate user devices 202 without ruining the integrity of the video.

It should be understood that, in some cases, when a network page includes mixed content types (e.g., video and text) the device that displays the text may also load the video content for display if desired by the user. Thus, one user device 202 may access the complete network page, and another user device 202 may access a portion of the network page.

Instead of, or in addition to, analyzing content to determine whether the content may be apportioned for access on multiple user devices 202, the content analyzer 270 may analyze content to identify complementary content that is separate from, but corresponds to the content. For example, the content analyzer 270 may determine whether a first network page is related to a second network page that a user accessing the first content may desire to view. For instance, the first network page may be an item detail page for a first item, and the second network page may be a list of reviews of the first item, an item detail page of a second item often bought with the first item, or a how-to guide for installing the first item. As a second example, the content analyzer 270 may identify complementary content that provides more detail on the primary content the user is accessing. For instance, the content analyzer 270 may identify a network page on a movie information database that provides additional information relating to a movie or television program the user is accessing (e.g., the use case illustrated in FIG. 1B).

The device identification system 272 can include any system capable of identifying one or more user devices 202 that may serve as a complementary device for a particular piece of complementary content. For instance, a television may act as a complementary device for a video, but a speaker system typically will not be able to display a video. Further, although the television may be able to receive a video for display, the television may be determined to be in use or located more than a threshold geographic distance away from the current primary device and thus, not suitable as the complementary device at a particular instance in time. In such cases, the television may not be selected as the complementary device or the complementary content may be queued for future access.

The device identification system 272 may identify a device to serve as a complementary device based on the type of complementary content, the location of the potential complementary device, the characteristics of the device (e.g., does it include a screen, the size of the screen, etc.), the operating state of the device, etc. Further, the device identification system 272 may access the complementary content and complementary device data repository 246 to access information or metadata for each user device 202 registered with the intermediary system 204 or a corresponding entity thereof. The user devices 202 may be registered by the user who owns or otherwise has access to the user devices 202. Registering the user devices 202 may include identifying the capabilities of the user devices 202 as well as the type of content the user devices 202 can access based on the capabilities of the user devices 202 and/or the user's specific preferences.

In some cases, content that is accessible on one user device 202 may be in a format that is less than optimal for access on another user device 202. For example, the content may be sized for a different size screen. In such cases, the content formatter 274 may reformat the content for view on the complementary user device 202. Reformatting the content may include changing the file format of the content in addition to or instead of modifying the display dimensions of the content. Further, the content formatter 274 may remove portions of layers of the content for display with respect to certain complementary devices. For example, hyperlinks or additional content mouse overs may be removed from complementary content that is provided to a television. As a second example, advertisements may be removed from complementary content displayed on some complementary devices. In some such cases, the advertisements may still be displayed on the primary user device 202.

Although the intermediary system 204, and its component systems, is described as identifying complementary devices and complementary content for access on the complementary devices, in some embodiments, one or more of the user devices 202 may perform the functionality of the intermediary system 204. Thus, in some cases, a user device 202 may identify one or more other devices that may serve as a complementary device. The user device 202 may then identify complementary content to be accesses by the complementary device, and may cause the complementary device to access the complementary content and/or may provide the complementary content to the complementary device for access.

Example Process for Accessing Content on a Complementary Device

Figure 3:
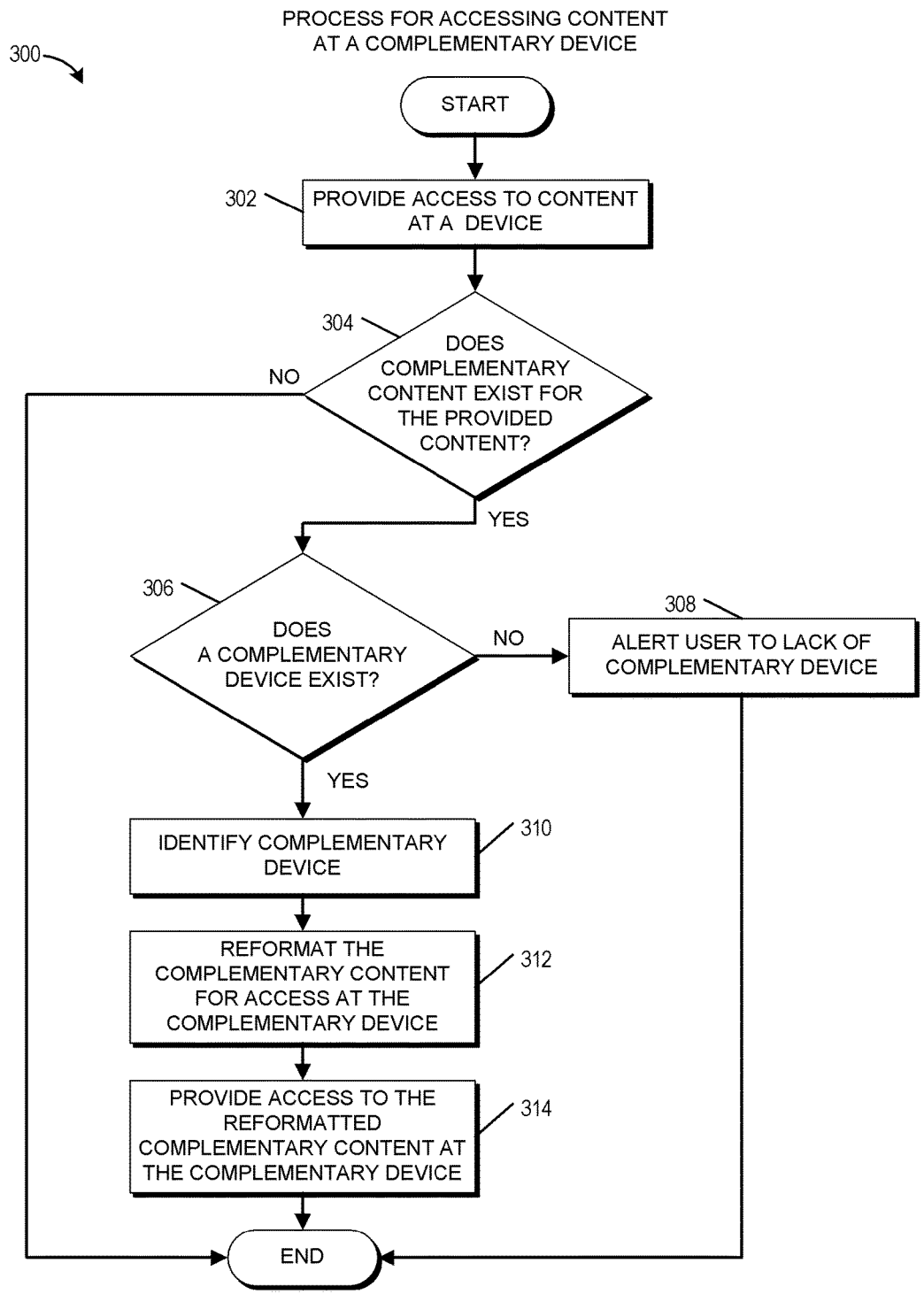
FIG. 3 is a flowchart of an embodiment of a process for accessing content at a complementary device.

FIG. 3 is a flowchart of an embodiment of a process 300 for accessing content on a complementary device. The process 300 may be implemented by any system that can determine whether complementary or additional content exists that is related to an initially accessed piece of content and that can provide access to this complementary content on a complementary device. For example, the process 300, in whole or in part, can be implemented by an intermediary system 204, a headless browser 240, a content analyzer 270, a device identification system 272, a content formatter 274, and a complementary screen agent 222, to name a few. Although any number of systems, in whole or in part, can implement the process 300, to simplify the discussion, portions of the process 300 will be described with reference to particular systems.

The process 300 begins at block 302 where, for example, the intermediary system 204 via the headless browser 240 provides access to content on a user device 202. This user device 202 may be any type of user device 202 capable of accessing the content. Further, the user device 202 is not limited to a device with a screen or display, but could include display-less devices, such as an audio music player.

At decision block 304, the content analyzer 270 determines whether complementary content exists for the content accessed at the block 302. In some cases, the content analyzer 270 determines whether complementary content exists by determining whether a user has identified complementary content for the content of the block 302. Typically, although not necessarily, the complementary content in such cases where the user has identified the complementary content may be a portion of the content of the block 302 or content linked (e.g., via a hyperlink or other network link) from the content of the block 302. However, in some cases, the user may identify other complementary content, such as another network page that is not linked to the original content accessed at the block 302.

In certain embodiments, the content analyzer 270 may discover or automatically identify complementary content. In some such cases, the discovery of complementary content may occur without interaction with the user who is provided access to the content of the block 302. Some example processes of discovering complementary content are described in more detail below with respect to FIG. 5.

In addition to determining whether complementary content exists, the decision block 304 may include determining whether the user associated with the device of the block 302 desires to use a complementary device or a second device to access complementary content. In some cases, this determination may be based on an interaction with the user. For example, if the user identifies the complementary content using a particular activity, such as a long press on a link or on a separable portion of the content accessed at the block 302, it may be determined that the user desires to access the complementary content on a complementary device. In some cases, the decision block 304 using, for example, the device identification system 272 may access the complementary content and complementary device data repository 246 can determine whether a template or set of rules exist for the user that defines when the user desires to use a complementary device to access complementary content.

If it is determined at the decision block 304 that complementary content does not exist for the provided content of the block 302, the process 300 ends. Similarly, if it is determined at the decision block 304 that the user does not desire to use a complementary device to access a particular complementary content identified, the process 300 may also end.

If it is determined at the decision block 304 that complementary content does exist, the device identification system 272 determines at decision block 306 whether a complementary device exists. The device identification system 272 may determine whether the complementary device exists by accessing the complementary content and complement or a device data repository 246 to determine whether an entry associated with the user exists and whether the entry identifies any complementary devices registered to the user. Further, decision block 306 may include determining whether any identified complementary devices are accessible and/or are capable of accessing the complementary content. Additional details relating to identifying complementary devices are described below with respect to FIG. 4.

If there are no complementary devices identified at the decision block 306, or if no complementary devices are accessible, the intermediary system 204 alerts a user to the lack of a complementary device at block 308. Alerting the user to the lack of a complementary device may, for example, include displaying a message (e.g., via a text box or a pop-up dialog box), playing an audio alert (e.g., a beeping sound), or flashing a window. In some embodiments, the block 308 may be optional or omitted. In some such embodiments, the process 300 ends if a complementary device is not identified at the decision block 306.

If it is determined that a complementary device does exist at the decision block 306, the device identification system 272 identifies the complementary device at block 310. Identifying the complementary device may include identifying the type of the complementary device, obtaining access information for the complementary device (e.g., an IP address, a MAC address, etc.), obtaining device capabilities for the complementary device (e.g., screen size, audio capability, a supported file types, etc.), and any other information that can facilitate providing access to the complementary content on the complementary device.

At block 312, the content formatter 274 reformats the complementary content for access on the complementary device identified at the block 310. Reformatting the complementary content can include performing any process that facilitates making the complementary content accessible at the complementary device. For example, reformatting the complementary content may include modifying the size of the complementary content, removing advertisements from the complementary content, removing links from or adding links to the complementary content, and the like. In some cases, the content formatter 274 reformats the complementary content based on metadata associated with the identified complementary device, such as information relating to the capabilities of the complementary device. In some embodiments, the block 312 may be optional or omitted. For example, in some cases, the complementary device may be able to access the complementary content in its native form (e.g., in a form stored by an origin content server 206). In such cases, it may be unnecessary to reformat the complementary content.

In some embodiments, the block 312 may include obtaining complementary content from a source or provider of the content in a different format. In some cases, the content formatter 274 may access the origin content server 206 or a CDN server 208 to obtain content in a different format to be used as complementary content. For example, if it is determined that a video first accessed on a mobile device is to be used as complementary content and is to be presented to a user on a high-definition television, the content formatter 274 may access the origin content server 206 to obtain a higher resolution copy or to initiate a higher resolution stream of the video that that accessed by the mobile device. Similarly, the content formatter 274 may obtain a copy of content to be used as complementary content that is a different file format based on the user device 202 selected to serve as the complementary device.

At block 314, the intermediary system 204 provides access to the reformatted complementary content on the complementary device. This may include providing the reformatted complementary content to a complementary screen agent 222 on a user device 202 identified as the complementary device, which typically differs from the user device 202 of the block 302. Providing the complementary content to the complementary screen agent 222 may include waking up the complementary device or otherwise modifying the state of the complementary device so that the complementary device is ready to receive the reformatted complementary content. In some cases, providing the reformatted complementary content causes the complementary screen agent 222 to wake-up or activate the complementary device.

In some implementations, the complementary content, or the reformatted complementary content, is accessed at least partially in parallel with the primary content, or the content accessed at the block 302. For example, a review of a movie may be accessed concurrently on a complementary device while the video is playing on the primary device. As a second example, product recommendations may be viewed on one device while an item detail page is displayed on another device. As a third example, audio may be played substantially concurrently on a complementary device while a video is played on a primary device. Advantageously, in certain embodiments, by playing audio on a different device, users who desire to listen to a video in a different language from another user may watch the same video. Further, multiple complementary devices may be used with the primary device. For instance, the primary device may be a television that displays a movie and multiple users may each have a set of headphones connected to a secondary device (e.g., a smartphone) that plays the audio in a language of choice thereby enabling two, three, or any number of users to watch the same video while listening to the audio in their chosen language.

Further, in some cases, the block 314 may include requesting confirmation from the user that the complementary content is to be provided to the identified complementary device. In some cases, the block 314 requests the confirmation if the identified complementary device is determined to be in use or is in an active state. However, if the identified complementary device is determined to not being use or as in a sleep state, the complementary content may be provided to the complementary device without requesting confirmation from the user. In other cases, confirmation is requested from the user regardless of the state of the complementary device. Advantageously, in certain embodiments, by requesting confirmation from the user that the complementary content is to be provided to the identified complementary device, the process 300 can avoid interrupting another user's access of the complementary device.

In some cases, the complementary content may be provided to the user device 202 that accessed the initial or primary content at the block 302 and the primary content may be accessed by the complementary device. In other words, in some cases, the original content may be switched to the complementary device while the complementary content may be accessed on the original device. Advantageously, in certain embodiments, by switching the original content to the complementary device, the user can continue to access or browse new content while maintaining access to the original content. For example, the user may desire to maintain access to an item detail page for an item while browsing reviews of the item. Although the reviews may be presented on the complementary device, in some cases, the user may desire to access the reviews on the initial device and move the item detail page to the complementary device. In cases where the complementary content is presented on the initial device, the device used to access the initial content at the block 302, the initial content may be reformatted for presentation on the complementary device.

Moreover, in some cases, an identified complementary device may not be currently accessible or may be beyond a threshold distance from the device of the block 302. In some such cases, the identified complementary device is not identified as a usable complementary device. However, in some cases, the complementary content may be queued or identified for access by the identified complementary device at a later time. In other words, in some cases, complementary content can be accessed at different times compared to the access of primary content.

Although the process 300 is described above as being performed with respect to an intermediary device, such as the intermediary system 204, in some embodiments, it is possible to perform the process 300 without an intermediary device. In other words, in some embodiments, the process 300 may be performed by one or more user devices 202. For instance, a first user device 202 serving as a primary user device may perform the process 300 and may directly access a second user device to receive content as a complementary device.

Example Complementary Device Selection Process

Figure 4:
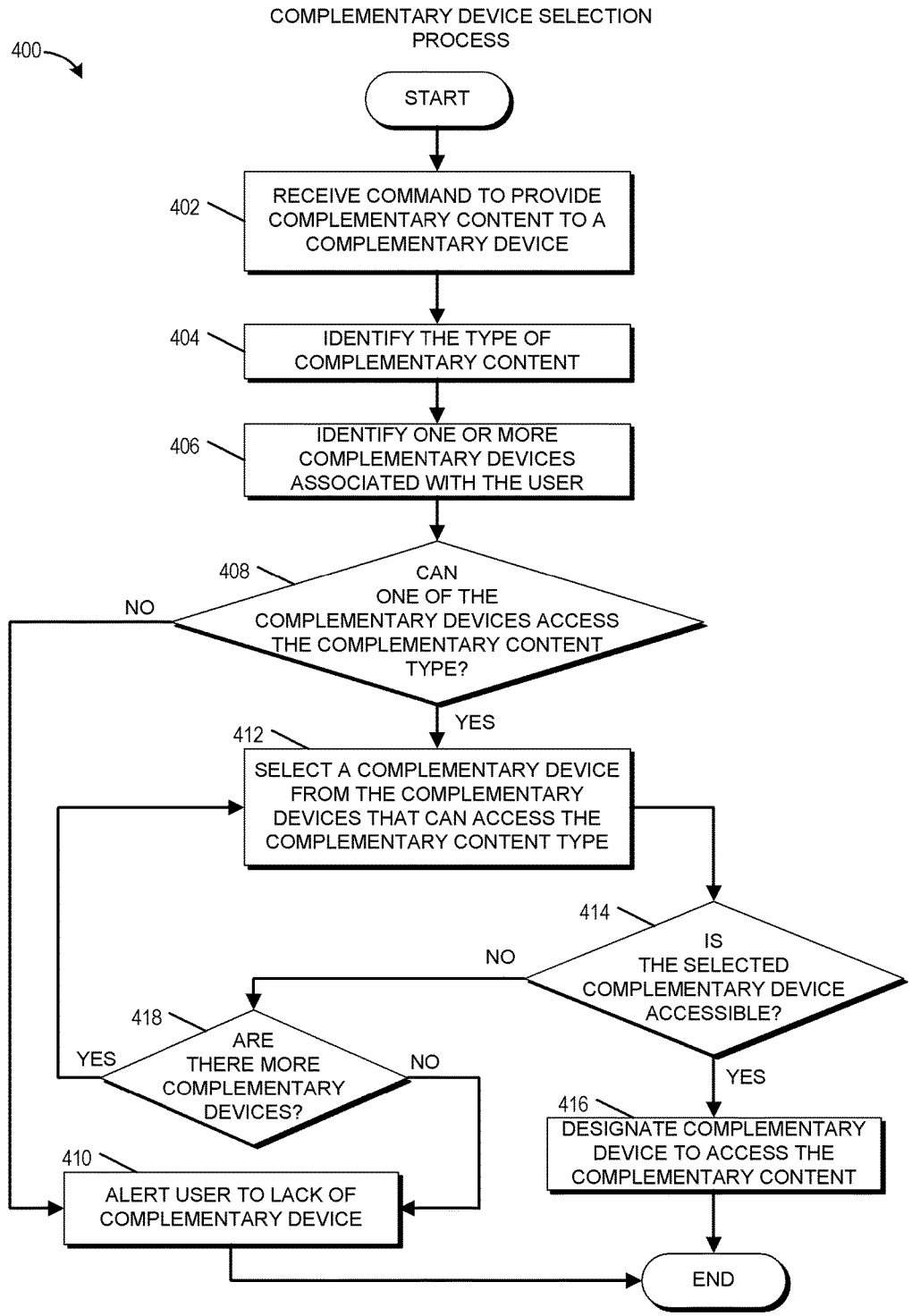
FIG. 4 is a flowchart of an embodiment of a complementary device selection process.

FIG. 4 is a flowchart of an embodiment of a complementary device selection process 400. The process 400 may be implemented by any system that can identify a user device capable of acting as a complementary device for accessing a selected piece of complementary content. For example, the process 400, in whole or in part can be implemented by an intermediary system 204, a headless browser 240, a content analyzer 270, a device identification system 272, a content formatter 274, and a complementary screen agent 222, to name a few. Although any number of systems, in whole or in part, can implement the process 400, to simplify the discussion, portions of the process 400 will be described with reference to particular systems.

The process 400 begins at block 402 where, for example, the intermediary system 204 receives a command to provide complementary content to a complementary device. The command may be received from a user who may trigger the command to be provided to the intermediary system 204 by, for example, selecting or interacting with a particular button on the user device 202 on a display of the user device 202. Alternatively, or in addition, the user may cause the command to be provided by interacting with content in a particular manner, such as by using a long press on a keyboard or on a display, double tapping or triple tapping on a particular area of a display, or otherwise interacting with the user device in a designated manner.

In certain embodiments, the command may be received from a system internal to the intermediary system 204, such as the content analyzer 270. For example, the content analyzer 270 may generate a command to provide complementary content to the complementary device in response to determining the existence of the complementary content by, for example, analyzing the primary content or accessing the complementary content and complementary device data repository 246 to determine whether complementary content is associated with the primary content. Thus, in some cases, the receipt of the command at the block 402 is triggered by the availability of the complementary content. Further, in some cases, the command may be triggered by the type of the primary content and/or the availability of a complementary device.

At block 404, the content analyzer 270 identifies the type of complementary content. The type of complementary content may be identified based on tags, analyzing the complementary content, user input, or any other method for identifying a content type. Further, identifying the type of complementary content may include determining whether the complementary content includes text, video, audio, interactive links (e.g., hyperlinks), interactive content (e.g., games or interactive media, etc.), and the like.

The device identification system 272 identifies one or more complementary devices associated with the user at the block 406. Identifying the one or more complementary devices can include accessing the complementary content and complementary device data repository 246 to identify one or more devices registered with the user or an account of the user. Alternatively, or in addition, identifying the one or more complementary devices may include detecting network accessible devices using known device detection technologies (e.g., pinging, accessing a table of authorized devices from a user's local network router, communications signal scanning, etc.). The detection of network accessible devices may be performed by one or more of the intermediary system 204, the user device 202 serving as the primary device accessing the primary piece of content, and any other network device that may be part of a local network associated with the user.

Further, in some implementations, the block 406 may include receiving the identity of one or more complementary devices from the user. The identity of the one or more complementary devices may be received at some earlier point in time from the user and/or may be received along with a request or command to access complementary content.

In some implementations, identifying complementary devices associated with the user may include identifying complementary devices registered with an account at the intermediary system 204 or a set of authorized users. Further, the block 406 may include identifying devices registered or associated with multiple accounts. For instance, multiple members of a family may have a separate account with the intermediary system 204. Some devices may be registered with multiple accounts and some devices may be registered with one account, but not another. The block 406 may include selecting a complementary device from one, some, or all of the accounts registered with the family, or an identified set of users. Advantageously, in certain embodiments, by identifying a complementary device registered with one or more user's accounts, one user can share content with another user. For instance, suppose a user is reading an article that includes a funny comic or an interesting video and that the user wants to share the comic with another user (e.g., a spouse). Instead of bringing the user's device to the second user, the user can indicate that specify the second user's device as the complementary device, identify the comic as the complementary content, and can cause the comic to be displayed on the second user's device. Further, the comic may be reformatted to optimize it for display on the second user's device.

At decision block 408, the device identification system 272 determines whether one of the complementary devices identified at the block 406 can access the complementary content type identified at the block 404. If it is determined that there are no complementary device is capable of accessing the complementary content type, the intermediary system 204 alerts the user to the lack of a complementary device, or a complementary device capable of accessing the complementary content type, at the block 410. In certain embodiments, the block 410 can include one or more of the embodiments described with respect to the block 308 of the process 300. Further, as with the block 308, the block 410 may be omitted or optional in some cases.

If it is determined at the decision block 408 that at least one of the identified one or more complementary devices can access complementary content of the type identified at the block 404, the device identification system to 272 selects a complementary device from the complementary devices that can access the complementary content type at the block 412. Selecting the complementary device may include selecting the device based on a template or device selection rules configured by the user. In some cases, the complementary device may be selected based at least in part on a command received from the user or based on the complementary content type. In certain cases where multiple complementary devices may be capable of accessing the complementary content type, a user may specify a particular complementary device for accessing complementary content of a particular type regardless of the existence of other complementary device is capable of accessing a particular type of complementary content. Further, the device identification system to 272 may determine based at least in part on the capabilities of a plurality of complementary devices that a particular complementary device is preferable for accessing the complementary content type despite the plurality of complementary devices being capable of accessing the complementary content in this particular example.

In some embodiments, the complementary device may be selected based at least in part on an amount of power or an amount of bandwidth estimated or required to access the complementary content. Further, in some cases, the complementary device may be selected based at least in part in the communication technologies (e.g., WiFi, 4G cellular, Ethernet, etc.) available to access the complementary content.

At decision block 414, the device identification system 272 determines whether the selected complementary device is accessible. Determining whether the complementary device is accessible may include determining whether the complementary device is a threshold distance from the primary device. This threshold distance may vary depending on the complementary content type. For example, the threshold distance may be greater, in some cases, for audio content than for video or text content. Further, determining whether the complementary device is accessible may include determining whether the complementary device can be accessed or activated from a sleep state, modified from a powered-off state to a powered-on state, or otherwise reconfigured from a state not capable of accessing complementary content to a state that is capable of accessing complementary content.

Moreover, in some cases, determining whether the complementary device is accessible include determining whether the complementary device is currently in use. If it is determined that the complementary device is currently in use, the complementary device may be determined to be inaccessible. Alternatively, the device identification system 272 may request permission to override or otherwise obtain access to the complementary device. If permission is granted, the device may be selected for use and if the permission is not granted, the device may be determined to be inaccessible. In certain embodiments, the device identification system 272 may override access of the complementary device regardless of the current usage state of the complementary device. Advantageously, in certain embodiments, by automatically overriding access of the complementary device, the user can replace content being accessed by the complementary device with the complementary content without needing to confirm each interaction with the complementary device making for an improved user experience. Advantageously, in certain other embodiments, by requesting permission to override access of the complementary device, embodiments disclosed herein are prevented from automatically interfering with the user's use, or other users' use, of the complementary device. In certain cases, a device or the intermediary system 204 may be configured to prevent the access of complementary content by a potentially complementary device when the device is in use, thereby preventing one user from inadvertently, or intentionally, interfering with another user's use of a potentially complementary device.

If it is determined at the decision block 414 that the complementary device is accessible, the device identification system 272 designates the complementary device to access the complementary content at the block 416. The designated complementary device may access or receive access to the complementary content as described with respect to the process 300.

If it is determined that the decision block 414 that the complementary device is not accessible, the device identification system 272 determines that the decision block 418 whether there are more complementary devices identified at the block 406. If so, the process 400 returns to the block 412 where another complementary device is selected from the complementary devices identified at the block 406. The selection of another complementary device may include determining that the new potential complementary device is capable of accessing the complementary content as described with respect to the decision block 408. If it is determined that the decision block 418 that there are no more potential complementary devices, the process 400 proceeds to the block 410.

Although the process 400 is described above as being performed with respect to an intermediary device, such as the intermediary system 204, in some embodiments, it is possible to perform the process 400 without an intermediary device. In other words, in some embodiments, the process 400 may be performed by one or more user devices 202. For instance, a first user device 202 serving as a primary user device may perform the process 400 and may determine the second user device 202 that may serve as the complementary device for a particular piece of complementary content.

Example Complementary Content Discovery Process

Figure 5:
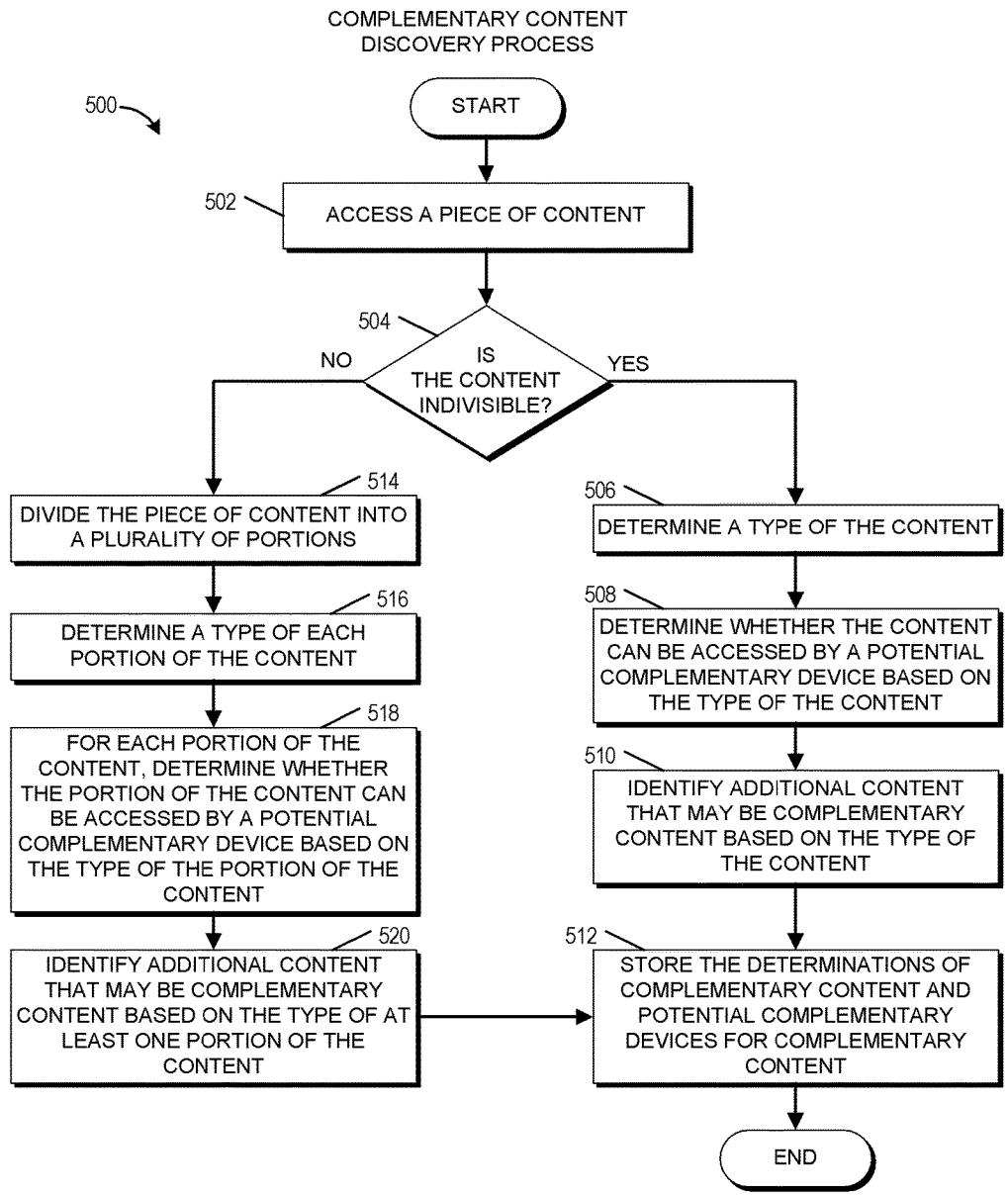
FIG. 5 is a flowchart of an embodiment of a complementary content discovery process.

FIG. 5 is a flowchart of an embodiment of a complementary content discovery process 500. The process 500 may be implemented by any system that can identify content that can serve as complementary content for a piece of content. For example, the process 500, in whole or in part, can be implemented by an intermediary system 204, a headless browser 240, a content analyzer 270, a device identification system 272, a content formatter 274, and a complementary screen agent 222, to name a few. Although any number of systems, in whole or in part, can implement the process 500, to simplify the discussion, portions of the process 500 will be described with reference to particular systems.

Generally, the process 500 is for automatically detecting complementary content without interacting with a user. However, in some embodiments, at least some of the process 500 may be performed in response to a command from a user. Further, the process 500 may be performed in real time (e.g., in response to a user accessing a piece of content) or in advance of content access. Advantageously, in certain embodiments, by performing the process 500 in advance of content access, complementary content may be predetermined speeding up the process of obtaining access to the complementary content. Further, in some cases, the intermediary system 204 may preload potential complementary content to the cache 242 and/or to a potential complementary device thereby further increasing the speed to access of the complementary content.

The process 500 begins at block 502 where, for example, the intermediary system 204 using, for example, the headless browser 240, accesses a piece of content. At the decision block 504, the content analyzer 270 determines whether the content is indivisible. In some cases, content is considered indivisible if dividing it into portions would modify the accessibility of the content or make the content inaccessible as intended. For example, a video may be considered indivisible in some cases as dividing the video into portions for display on different devices may be undesirable. However, in other cases, a video may not be considered indivisible as a user may desire to obtain a still frame from the video or watch two portions of the video synchronously.

Further, the decision block 504 may, in some cases, include determining whether the content is of a uniform type or a single piece of content. In other words, the decision block 504 may include determining whether the content is a single video, a single audio stream, a single text article, etc.

In some implementations, advertisements and/or links may be ignored in determining whether the content is of a uniform type or is indivisible. Further, in some cases, content of a single or uniform type may be considered non-uniform if portions of the content exist for different purposes. For example, a network page comprising only text may be considered non-uniform a portion of the text is a product description and another portion of the text is review content.

If it is determined at the decision block 504 that the content is indivisible and/or, in some cases, of a uniform type, the content analyzer to 270 determines a type of the content at the block 506. The type of the content may include any type of content that can be accessed by a user device 202. For example, the content type may include video, audio, text, interactive content, non-interactive content, games, and the like. Further, determining the type of the content may include determining whether the content is of a mixed type, such as audio and video, or video and text.

At the block 508, the content analyzer 270 determines whether the content can be accessed by a potential complementary device based on the type of the content. Advantageously, in certain embodiments, determining whether the content can be accessed at a potential complementary device enables cases where the content is moved to a complementary device and complementary content is accessed by the primary device. In some implementations, the block 508 may be optional or omitted.

At the block 510, the content analyzer 270 identifies additional content that may be used as complementary content based on the type of the content. For example, the additional content may include videos, audio, text, brother content related to the content accessed at the block 502. This additional content may include any type of content that can be related to the content accessed at the block 502. For example, the additional content may include reviews, descriptive content (e.g., cast information or other related content may service complementary content for a movie), recommendations, statistical information (e.g., fantasy sports information relating to a viewed sports match), etc. In some cases, no complementary content may be identified at the block 510 for certain content accessed at the block 502. In such cases, the process 500 may end with the completion of the block 510.

In some implementations, the additional content may be identified by accessing tags, titles, labels, etc., that are associated with the content or analyzing the content to identify key terms. In some cases, the key terms may be terms that have previously been identified for use in identifying complementary content. Alternatively, or in addition, the key terms may be terms that appear a threshold number of times or at a threshold rate in a piece of content. These tags, titles, key terms, etc., may be used, in some cases, to perform a keyword search of a network (e.g., the Internet) to identify additional content that can serve as complementary content.

At the block 512, the content analyzer 270 stores the determination of where the identity of complementary content for the content accessed at the block 502 in a repository, such as the complementary content in complementary device data repository 246. Further, in some cases, the block 512 may include storing the identity of potential complementary devices capable of accessing the complementary content at the repository. In some cases, instead of or in addition to storing the determination at a repository, the complementary content may be provided to a complementary device.

If it is determined at the decision block 504 that the content is divisible and/or, in some cases, not of a uniform type, the content analyzer 270 divides the piece of content into a plurality of portions at block 514. At the block 516, the content analyzer 270 determines the content type for each portion of the plurality of portions of the content. In some cases, a particular portion of content may have an indeterminable type. In some such cases, a portion with an indeterminable content type may be ignored for the purpose of identifying complementary content. In some cases, a portion of the content associated with an indeterminable content type may be used to identify other complementary content, but may not be used as complementary content itself.

For each portion of the content, a device identification system 272 may determine at block 518 whether the portion of the content can be accessed by a potential complementary device based on the content type of the portion of the content. In some cases, the device identification system 272 may determine that a portion of the content can be accessed by all complementary devices associated with the user, none of the complementary device associated with the user, or a subset of complementary devices associated with the user. It should be understood that, generally, the determination of whether a portion of content can be accessed by a potential complementary device is determined for all devices associated with the user because, typically, each user device 202 of a user may serve as a primary device or a complementary device. Thus, there is usually not a subset of user devices 202 that is configured to serve as a complementary device, but not a primary device. However, in certain embodiments, some user devices 202 may serve as either a primary device or a complementary device for a particular piece of content, while other user devices 202 may serve as a primary device or a complementary device, but not both.

Each portion of the content that is identified as accessible by a potential complementary device may serve as complementary content. For example, suppose that the piece of content accessed at the block 502 includes a video and some text content underneath the video (e.g., use case illustrated in FIG. 1A). In such a case, the video, the text, or both the video and the text can each serve as complementary content accessible by a complementary device.

At the block 520, the content analyzer 270 identifies additional content that may be complementary content based on the type of at least one portion of the content. The block 520 may include one or more of the embodiments described with respect to the block 510. Further, additional content may be determined separately for each portion of the content of the plurality of portions. Alternatively, or in addition, additional content may be determined for two or more portions of the content. For example, suppose that the content accessed at the block 502 can be divided into two videos and three text portions. In such a case, additional content may be determined for each video and each text portion separately and/or for any combination of the videos and text portions together.

The process 500 may then proceed to the block 512 where the various determinations of complementary content and potential complementary devices may be stored in a repository as previously described with respect to the block 512.

Although the process 500 is described above as being performed with respect to an intermediary device, such as the intermediary system 204, in some embodiments, it is possible to perform the process 500 without an intermediary device. In other words, in some embodiments, the process 500 may be performed by one or more user devices 202. For instance, a first user device 202 serving as a primary user device may perform the process 500 and may identify complementary content that can be provided to a second user device 202 that may serve as the complementary device for accessing the identified complementary content.

Although complementary content has primarily been described as a portion of primary content or as different content, which is semantically related to the primary content, in some cases, the complementary content may be the same content. Further, the complementary content may be formatted or optimized for another device. For instance, a video game formatted for use with a laptop or desktop computing device may serve as complementary content for a version of the video game optimized for use on a smartphone. This complementary content may be identified based on the title or some unique identifier of the content (e.g., a stock keeping unit (SKU) code). The version of the video game for the smartphone may have identical content as the version of the video game for the laptop, but may be optimized to run for the smartphone. For example, the controls may differ and the resolution of the graphics may differ, but the objectives, story, and gameplay may be the same. Alternatively, the version of the video game for the smartphone may differ to some degree from the version for the laptop. For example, the laptop version of the game may have an extra level, or the smartphone version of the game may have simplified gameplay due to the different controls available to the user.

Generally, the process 500 may be performed a priori, which speeds up the process of providing complementary content to a complementary device. However, in some cases, the process 500 may be performed in real time. For instance, a newly accessed piece of content may not yet be associated with complementary content and thus, the process 500 may be performed in real time. As another example, the process 500 may be updated in real time in response to a new device being registered with an account of the user.

In certain embodiments, the complementary content can be interactive content that modifies the primary content. For example, the complementary content may configure a complementary device to function as a remote control for the primary device. In another instance, the complementary device may display the primary content in a different context. For example, a user may miss part of an event or video (e.g., a sports event) while getting a snack. Rather than cause everyone to rewatch the missed portion of the event, the user can access the video on a complementary device to watch the portion the user missed while other users continue to watch the event in real time.

Terminology

The intermediary system 204 may be a single computing device, or it may include multiple distinct computing devices, such as computer servers, logically or physically grouped together to collectively operate as an intermediary system. The components of the intermediary system 204 can each be implemented as hardware, such as a server computing device, or as a combination of hardware and software. In addition, the modules and components of the intermediary system 204 can be combined on one server computing device or separated individually or into groups on several server computing devices. In some embodiments, the intermediary system 204 may include additional or fewer components than illustrated in FIG. 2. In certain embodiments, at least some of the components of the intermediary system 204 may be implemented using specialized or application-specific hardware. For instance, the content analyzer 270 and the device identification system 272 may each be implemented with application-specific hardware configured to perform the functions and processes described herein.

In some embodiments, the features and services provided by the intermediary system 204 may be implemented as web services or network services consumable via the communication networks 210. In further embodiments, the intermediary system 204 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 206 and CDN servers 208 can correspond to logical associations of one or more computing devices for hosting content and servicing requests for the hosted content over the network 210. For example, a content server 206 or CDN server 208 can include a web server or network server component corresponding to one or more server computing devices for obtaining and processing requests for content (such as content pages) from user devices 202, the intermediary system 204, or other devices or service providers. In some embodiments, one or more content servers 206 may be associated with one or more CDN service providers (e.g., entities that manage multiple CDN servers 208), application service providers, etc.

Many other variations than those described herein will be apparent from this disclosure. For example, depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of providing access to complementary content on a complementary device, the method comprising:
    by an intermediary system that operates as an intermediary between user devices and content sites, storing device registration information of a plurality of user devices that are registered with a user account of a user, the device registration information comprising device selection preference data specifying at least one preference specified by the user for selecting a complementary user device on which to display content, the intermediary system comprising computer hardware;
    providing, by the intermediary system, access to primary content on a first device of the plurality of user devices;
    identifying, by the intermediary system, complementary content for the primary content, wherein the complementary content comprises content that is determined to be related to the primary content, wherein the intermediary system identifies the complementary content by a process that comprises identifying key terms in the primary content and executing a keyword search using the identified key terms;
    identifying, by the intermediary system, a second device for displaying the complementary content, wherein the intermediary system selects the second device from the plurality of user devices based at least partly on the device selection preference data;
    determining a usage state of the second device;
    determining that the usage state of the second device satisfies a usage condition corresponding to an ability of the second device to present the complementary content;
    accessing the complementary content; and
    providing the second device with access to the complementary content, wherein providing the second device with access to the complementary content comprises:

determining an alternative format supported by the second device for the complementary content;
reformatting the complementary content based on the alternative format to obtain reformatted complementary content; and
providing the second device with access to the reformatted complementary content.

2. The method of claim 1, wherein the device registration data comprises device capabilities data that specifies capabilities of the second device, and the intermediary system selects the second device based additionally on the device capabilities data.

3. The method of claim 1, further comprising determining a content type of the complementary content, wherein identifying the second device comprises determining whether the second device is capable of accessing content that is of the content type.

4. The method of claim 1, wherein the intermediary system selects the second device based additionally on device location data obtained by monitoring locations of the user devices.

5. The method of claim 1, further comprising receiving an indication of a selection by a user of a portion of the primary content from the first device and identifying the portion of the primary content as the complementary content for access by the second device.

6. The method of claim 1, wherein the intermediary system identifies the key terms and executes the keyword search in real time in response to the first device accessing the primary content.

7. The method of claim 1, wherein the intermediary system identifies the key terms and executes the keyword search prior to the first device accessing the primary content.

8. A system for providing access to complementary content on a complementary device, the system comprising:
a data repository that stores device registration information of a plurality of user devices that are registered with a user account of a user, the device registration information comprising device selection preference data specifying at least one preference specified by the user for selecting a user device on which to display complementary content, the intermediary system comprising computer hardware;
a content access system comprising computer hardware including one or more hardware processors, the content access system configured to provide a first device of the plurality of user devices with access to first content;
a content analyzer comprising one or more hardware processors and configured to identify second content associated with the first content, wherein the content analyzer is configured to identify the second content by a process that comprises identifying key terms in the first content and executing a keyword search using the identified key terms; and
a device identification system comprising one or more hardware processors and configured to:
identify additional devices of the user based on the registration information; and
select, from the additional devices, a second device on which to display the second content, wherein the device identification system selects the second device based at least partly on the device selection preference data and on a usage state of the second device;
wherein the content access system is further configured to provide the second device with access to the second content concurrently with access of the first content by the first device;
wherein the content access system, in providing the second device with access to the second content, is capable of:
determining an alternative format supported by the second device for the second content;
reformatting the second content based on the alternative format to obtain reformatted second content; and
providing the second device with access to the reformatted second content.

9. The system of claim 8, wherein the second content comprises content from a different content source than the first content.

10. The system of claim 8, wherein the second content comprises a portion of the first content.

11. The system of claim 10, wherein the content analyzer is further configured to identify a content type of the portion of the first content and wherein the device identification system is further configured to select the second device from the additional devices based at least in part on the content type of the portion of the first content.

12. The system of claim 8, wherein the content analyzer is further configured to identify a content type of the second content and wherein the device identification system is further configured to select the second device from the additional devices based at least in part on the content type of the second content.

13. The system of claim 8, wherein the second device is of a different type than the first device.

14. The system of claim 8, wherein the content analyzer is further configured to identify the second content by accessing a template associated with the first content.

15. The system of claim 8, wherein the content analyzer is further configured to identify the second content based on a content selection command received in response to an action from the user.

16. The system of claim 8, wherein the device identification system is further configured to select the second device from the additional devices based at least in part on device capabilities data stored in the data repository for at least the second device.

17. The system of claim 8, wherein the device identification system is further configured to select the second device from the additional devices based at least in part on a location of the second device with respect to a location of the first device.

18. The system of claim 8, wherein the content access system is further configured to cause a change to an operating state of the second device prior to providing the second device with access to the second content.

19. The system of claim 8, wherein the content access system provides the first device with access to the first content at a first time and provides the second device with access to the second content at a second time, the second time later than the first time.

20. Non-transitory physical computer storage comprising instructions stored thereon that, when executed by one or more processors, are configured to implement a system for providing access to complementary content on a complementary device, the system comprising:
a data repository that stores device registration information of a plurality of user devices that are registered with a user account of a user, the device registration information comprising device selection preference data specifying at least one preference specified by the user for selecting a user device on which to display related content, the intermediary system comprising computer hardware;

a content access system configured to provide a first device of the plurality of user devices with access to first content;

a content analyzer configured to identify semantically related content associated with the first content, wherein the content analyzer is configured to identify the semantically related content by a process that comprises identifying key terms in the first content and executing a keyword search using the identified key terms; and a device identification system configured to:
   identify additional devices of the plurality of user devices; and
   select, from the additional devices, a second device on which to display the semantically related content based at least in part on the device selection preference data and on a usage state of the second device;

the content access system further configured to provide the second device with access to the semantically related content;

wherein the content access system, in providing the second device with access to the semantically related content, is capable of:
   determining an alternative format supported by the second device for the semantically related content;
   reformatting the semantically related content based on the alternative format to obtain reformatted, semantically related content; and providing the second device with access to the reformatted, semantically related content.

21. The non-transitory physical computer storage of claim 20, wherein the device identification system selects the second device based additionally on device location data specifying current locations of the first and second devices.

22. The non-transitory physical computer storage of claim 20, wherein the content analyzer is further configured to identify a content type of the semantically related content and wherein the device identification system is further configured to select the second device based at least in part on the content type of the semantically related content.

23. The non-transitory physical computer storage of claim 20, wherein the content access system is further configured to wake-up the second device from a sleep state.

* * * * *